April 27, 1971   I. L. BRAZIER   3,576,649
PLASTIC PACKAGE FOR ELECTRICALLY NON-CONDUCTIVE MATERIAL
Filed Feb. 25, 1969

6, HEAT SEAL SEAM
12
10, FLEXIBLE PLASTIC FILM
13
11, HEAT SEALABLE ETHYLENE POLYMER LAYER INCLUDING A FATTY ACID AMIDE
ELECTRICALLY NON-CONDUTIVE PULVERENT MATERIAL
5, HEAT SEAL SEAM

INVENTOR
IRVIN L. BRAZIER

BY

ATTORNEY

United States Patent Office 3,576,649
Patented Apr. 27, 1971

3,576,649
PLASTIC PACKAGE FOR ELECTRICALLY NON-CONDUCTIVE MATERIAL
Irvin L. Brazier, West Milwaukee, Wis., assignor to Milprint, Inc., Milwaukee, Wis.
Filed Feb. 25, 1969, Ser. No. 802,002
Int. Cl. A23f 1/00
U.S. Cl. 99—152                   8 Claims

ABSTRACT OF THE DISCLOSURE

A package for electrically non-conductive pulverulent material. The package has an inner layer of heat sealable ethylene polymer to which is added a fatty acid amide in a quantity such that the pulverulent material being packaged will not be attracted to film areas that are to be heat sealed to form a completed package, such as may occur if a charge of static electricity is generated when film from which the package is made passes through a packaging machine of the form-and-fill type.

BACKGROUND OF THE INVENTION

(1) Field

The present invention relates to the field of plastic packaging films particularly adapted for the formation of packages for non-conductive pulverulent material in which the film has an ethylene polymeric layer for the formation of heat seals and wherein the heat sealable ethylenic layer is modified so as to prevent the development of static electricity charges.

(2) Prior art

One of the difficult existing problems in the art of packaging is the inability of form-and-fill type packaging machines to utilize a packaging film that includes a layer of ethylene polymer material as the heat sealable layer of the film structure. In the form-and-fill machine, a web of the packaging film is fed into the machine and folded into a tube with overlapped longitudinal edges which are heat sealed together, a transverse bottom heat seal is made across the tube, and the pulverulent material is then fed into the tube, after which a second transverse heat seal is formed across the top to produce individual packages containing the desired quantity of the material being packaged. Often times the individual packages are filled with an inert gas such as nitrogen in order to preserve the packaged goods. It is necessary in this type of packaging operation that the heat sealable layer of the film be capable of forming high strength heat seals in a very short time; for example, when the transverse bottom heat seal is made across the tube, it is necessary that it be capable of withstanding the weight of the charge of packaged material that is fed into the tube. Also, if a gas-filled package is made, or if the packaged material itself may generate a gas, it is necessary that the heat seals be strong enough to withstand any internal pressures developed therein.

A heat sealable layer of an ethylene polymer, which may be an ethylene homopolymer or copolymer, has the heat seal characteristics desired for this type of packaging machine. However, its use in the form-and-fill machine is inhibited by the fact that a substantial charge of static electricity is built up due to the non-polar, non-conductive surface of the ethylene polymer layer as the film travels through the machine and is led around the various formers, rollers, filling tubes and other machine elements. When the pulverulent material being packaged is also electrically non-conductive, such as powdered soups, cake mixes, coffee, etc., the electrical charges thusly established will cause the packaged material to be attracted to or cling to the ethylene polymer heat sealable layer and some of the material will cling to the film in the areas which must be heat sealed together to form packages. This leads to poor heat seal seams because the packaged material will prevent intimate contact between opposing film surfaces necessary to form a hermetic seal. Air will be able to enter the package or inert gas will be able to escape from the package, so that the freshness or shelf life of the packaged material will be greatly reduced.

SUMMARY OF THE INVENTION

The present invention provides a packaging film having a heat sealable layer of an ethylene polymer that also includes a quantity of a fatty acid amide, saturated or unsaturated, in an amount effective to prevent attraction of the packaged material to the film as it progresses through a packaging machine. It is believed that the fatty acid amide added to the ethylene heat sealable layer has a non-polar molecular segment which dissolves in the ethylene layer and a polar molecular segment which is insoluble therein so that a conductive or partly-conductive surface is established along the ethylene layer. This surface causes the dissipation of static electrical charges, and it has been found that non-conductive pulverulent types of material can be packaged in a film of this type. The packaged material does not adhere to the inner surface of the film and, therefore, it does not interfere with or inhibit heat sealing of the film along its inner surface as must be done in order to form a finished package. The substrate film which carries the heat sealable ethylene polymer layer modified according to this invention may be a single layer or multiple layer film formed as a laminated or coated material, and a structure particularly useful for packaging coffee is disclosed herein.

DESCRIPTION OF THE DRAWINGS

The description sets forth the details of the present invention, in terms sufficient to instruct persons skilled in the art as to its practice, by means of several embodiments together with discussion of permissible variations therein, it being understood that the description is intended as illustrative but not limitative and that other embodiments and variations not specifically discussed are possible within the scope of the present invention. In the drawings.

DESCRIPTION OF THE PREFERRED EMBODIMENTS

Figure 1:
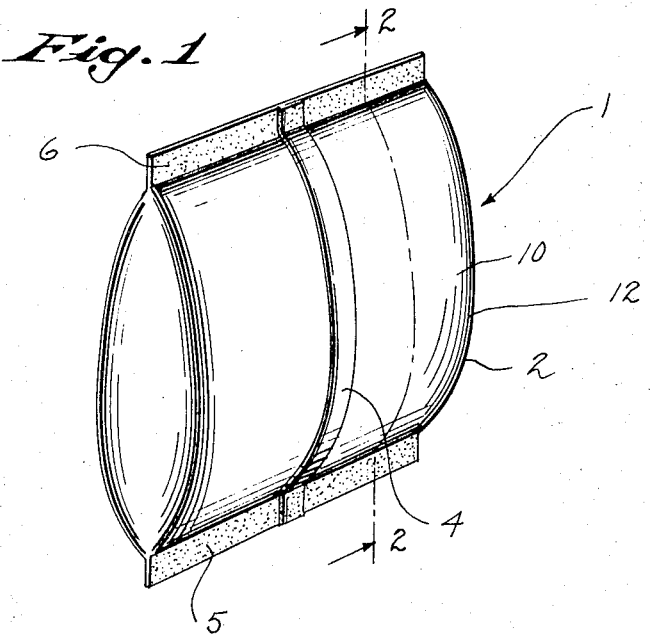
FIG. 1 is a perspective view of a completed package according to the present invention.
Figure 2:
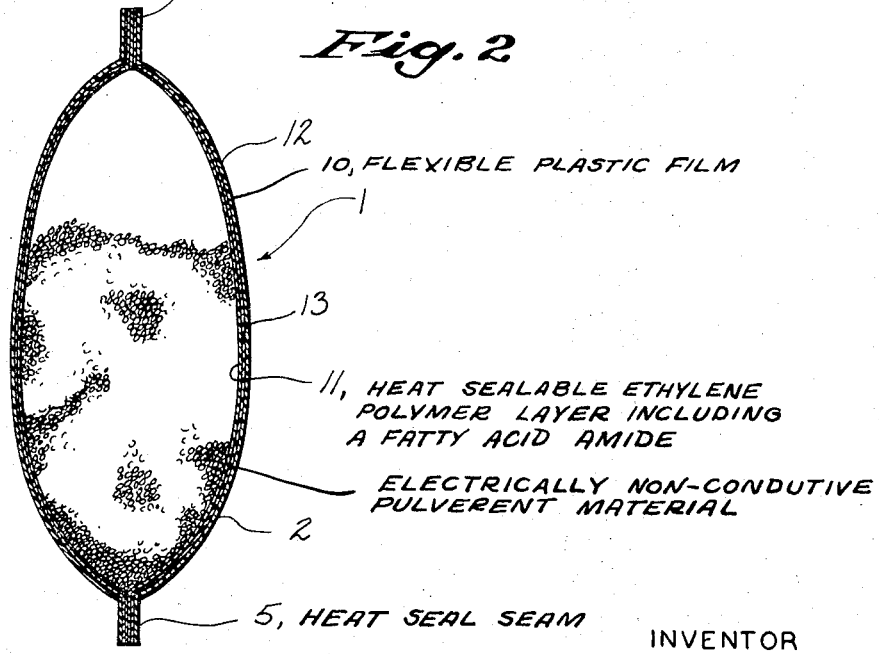
FIG. 2 is a sectional view of the package of FIG. 1.

FIGS. 1 and 2 illustrate a package 1 including a pouch 2 of film according to this invention and particulate solid material 3 package within the pouch. The pouch 2 is formed of a section of packaging film folded into tubular-shape and heat sealed together along a longitudinal seam 4, the film being heat sealed along its contacting inner layer to develop a fine seam which is folded flat against the rear wall of the finished package. Contacting opposed surfaces of the inner layer of the film are heat sealed together along a transverse bottom seam 5 and transverse top seam 6 to form the completed pouch.

As best shown in the sectional view of FIG. 2, the film from which the pouch 2 is made includes an outer layer 10 and an inner heat sealable layer 11. The outer film layer is a composite structure including a substrate film 12 and a coating 13, with the inner heat sealable layer 11 adhered along the coating 13 of the outer layer. The outer layer may be of various constructions and materials useful in the packaging art, for example "Mylar" polyester film, nylon, cellophane, paper, high density polyethylene, polyvinyl chloride, etc., and it may be either coated as shown on the drawings or uncoated. Furthermore, the outer film 10 may be a laminated construction of two or more similar or dissimilar films, such as metal foil joined to a polypropylene film. The particular layer or layers adopted for the outer film 10 will depend upon the characteristics demanded for suitable protection or preservation of the material packaged in the pouch.

The inner layer 11 of the film from which the pouch is made is to comprise a heat sealable ethylene polymer. This may include low density polyethylene, heat sealable copolymer of ethylene such as ethylene-vinyl acetate copolymer, ethylene-methylmethacrylate copolymer, and other copolymers or interpolymers of ethylene with one or more copolymerizable co-monomers containing a major portion (i.e. at least 50%) of ethylene. As an essential ingredient, the inner layer 11 must also include a fatty acid amide of the type formula $RCONH_2$. The fatty acid radical "R—" in the foregoing type formula is to have at least 13 carbon atoms, preferably in the range of 13 to 23 carbon atoms, and may be saturated or unsaturated. Examples of materials within this class definition useful in the practice of this invention include the following: tetradecanamide, stearamide, oleamide, behenamide, palmitamide, erucamide and mixture of two or more of the foregoing amides.

Furthermore, it is essential, in order to accomplish the objects of this invention, that the fatty acid amide as defined above be present at a critical minimum concentration level in the inner heat sealable layer 11; specifically, the layer 11 is to have at least 600 p.p.m., expressed on a weight basis, of the amide and most advantageously at least 1,000 p.p.m., in order to form the desired type of packages for use with non-conductive pulverulent materials. When the pouch 2 is made of a film in which a heat sealable ethylene layer does not include the fatty acid amide component, it has been found that the effects of static electricity causing adherence of the packaged material to the film prevents the formation of a satisfactory heat seal seam in the package and the same result obtains when the fatty acid amide is present at a quantity below the foregoing minimum level. The exact quantity of the fatty acid amide to be used above the aforesaid level will depend, in part at least, upon the nature of the ethylene polymer used for the inner heat sealable layer 11 and upon the particular amide or amides used.

The following examples set forth several constructions which have proved capable of meeting the objects of the present invention.

EXAMPLE 1

A pouch 2 as illustrated in FIG. 1 was manufactured from a film wherein the outer layer 10 comprised a 1 mil thick biaxially oriented polypropylene film having a 0.25 mil thick saran coating on one of its surfaces. Over the saran coating, a 2.5 mil thick layer of low density white opaque polyethylene was applied by extrusion coating to form the inner heat sealable layer 11. The polyethylene layer included 1,000 p.p.m. of a mixture of erucamide and oleamide (sold under the trade name RAM). The film was formed into pouches on a form-and-fill machine to produce individual packages of ground coffee. Nitrogen gas was added to the package to form an inert atmosphere for preservation of the coffee. It was found that there was no tendency for static electrical charges to build up on the film surface as it was traveling through the machine and, as a consequence, the ground coffee did not adhere to the film surface and obstruct the heat sealed seam areas. Furthermore, a heat seal such as the transverse bottom seam 5 developed sufficient strength in a short time so that a measured charge of the coffee ranging from several ounces to 2 pounds could be admitted into the partially-formed tubular container shortly after the bottom seam was formed. When the same film was tried without the fatty acid amide in the heat sealable ethylene inner layer, satisfactory packages of coffee could not be made on the same machine because of the adherence of coffee particles to the inner surface of the film, thereby preventing the formation of satisfactory hermetic packages.

EXAMPLE 2

Pouches 2 for the packages of this invention were manufactured wherein the outer layer of the film included a 1 mil thick biaxially oriented polypropylene film having a 0.25 mil thick saran coating on one of its surfaces and 0.5 mil thick nylon film laminated to its opposite surface. An inner layer 11 of the same composition as Example 1 was applied over the saran coating of the outer film. It was found that satisfactory packages for ground coffee could be formed on a form-and-fill machine without deleterious attraction of coffee into the heat sealed seam areas such as occurred when this same film was employed but without the fatty acid amide.

EXAMPLE 3

Pouches 2 were made from film having an outer layer comprising a 0.5 mil thick layer of biaxially oriented polypropylene film with a 0.2 mil thick saran coating on one of its surfaces and a 0.75 mil thick nylon film laminated to the saran coating. A 2.5 mil thick inner layer 11, of the same composition as in Example 1, was extrusion coated onto the uncoated surface of the polypropylene film layer opposite from the saran coating. The film was found highly suitable for packaging ground coffee and similar materials in that there was no tendency for such packaged materials to adhere to the inner surface of the film, and heat seals could be made on a form-and-fill machine without the coffee clinging to inner film areas that were heat sealed together to form finished packages.

Throughout this description, "heat seal," refers to the characteristic of softening or fusing to form a satisfactory bond between contacting portions of the film material upon the momentary application of heat and pressure. The temperatures employed are above the softening temperature of the inner heat sealable layer 11, the pressures may vary from less than 1 lb. to 50 p.s.i., and the "dwell time" during which the contacting material is subjected to heat and pressure is normally from a fraction of a second to several seconds.

There has been described a package according to this invention including a pouch formed of a film having an inner heat sealable layer of an ethylene polymer containing a defined class of fatty acid amides at a specified concentration level which has proved particularly effective for the packaging of substantially non-conductive pulverulent solids such as ground coffee, powdered milk, cocoa, non-dairy creamer, powdered soups, cake mixes, powdered drink mixes, etc. The packages of this invention solve the problems of attraction of such non-conductive materials to an ethylene polymer layer caused by the build-up of static electricity charges as the film moves over the mechanical elements of a form-and-fill machine, which problems are found in the prior art films used on such equipment that employed the same polymers as the heat sealable layer. Also, it has been found that the films of this invention need not be dusted with materials such as talc, starch and vegetable dust, that are commonly necessary with prior art films in this type of packaging application, thereby eliminating the problem of collection or accumulation of such dust on various elements of the packaging machine. This invention thus provides an improved package for non-conductive powdered or comminuted solid materials and enables the utilization of ethylene polymeric heat sealable layers on films employed in machines for packaging such materials.

I claim:

1. In a package of the form-and-fill type consisting of a container having heat sealed seams at opposite ends thereof to define a container enclosure and electrically non-conductive pulverulent material selected from the group consisting of ground coffee, powdered milk, powdered soups and powdered cake mixes packaged therein which tends to develop static electrical charges during packaging of said material, the container being made of flexible plastic packaging film material comprising (a) an outer film layer including a substrate film, and (b) an inner heat sealable layer distinct from the outer film layer and adhered thereto forming a laminated film structure, the improvement wherein:

(1) the inner layer is formed of a heat sealable ethylene polymer, and (2) the ethylene polymer inner layer includes at least 600 p.p.m., on a weight basis, of a fatty acid amide selected from the group consisting of tetradecanamide, stearamide, oleamide, behenamide, palmitamide, erucamide and mixtures thereof.

2. A package according to claim 1, wherein: the inner layer is heat sealable polyethylene, ethylene-vinyl acetate copolymer, or ethylene-methyl methacrylate copolymer.

3. A package according to claim 1, wherein: the outer layer comprises a film of biaxially oriented polypropylene with a saran coating on one of its surfaces, and the heat sealable ethylene polymer inner layer is adhered to said saran coating.

4. A package according to claim 3, wherein: the inner layer is heat sealable polyethylene, ethylene-vinyl acetate copolymer, or ethylene-methyl methacrylate copolymer.

5. A package according to claim 4 wherein: the non-conductive pulverulent material is coffee.

6. A package according to claim 1, wherein: the outer layer comprises a film of biaxially oriented polypropylene with a saran coating on one of its surfaces and a nylon film adhered to the saran coating, and the heat sealable ethylene polymer inner layer is adhered to the polypropylene film along a surface opposite from the saran coating.

7. A package according to claim 6, wherein: the inner layer is heat sealable polyethylene, ethylene-vinyl acetate copolymer, or ethylene-methyl methacrylate copolymer.

8. A package according to claim 7, wherein: the non-conductive pulverulent material is coffee.

References Cited
UNITED STATES PATENTS

| | | | |
|---|---|---|---|
| 2,422,725 | 6/1947 | Gilfillan | 99—171UX |
| 2,509,181 | 5/1950 | Zimmerman | 219—47 |
| 2,608,543 | 8/1952 | Wiswell | 99—171S |
| 2,672,268 | 3/1954 | Bower | 226—56 |
| 2,678,284 | 5/1954 | Holt | 117—33 |
| 2,773,773 | 12/1956 | Harden et al. | 99—176 |
| 3,330,668 | 7/1967 | Hiscock | 99—152 |
| 3,445,324 | 5/1969 | Curler et al. | 99—171LP |
| 3,449,299 | 6/1969 | Schneider et al. | 260—78 |
| 3,524,536 | 8/1970 | Terenzi et al. | 206—45.31 |
| 2,956,035 | 10/1960 | Mock | 260—23 |
| 3,441,552 | 4/1969 | Rombusch et al. | 260—93.7 |
| 3,485,786 | 12/1969 | Rombusch et al. | 260—80.78 |

NORMAN YUDKOFF, Primary Examiner

F. E. DRUMMOND, Assistant Examiner

U.S. Cl. X.R.

99—171LP, 171S; 206—45.31; 260—Dig. 17